(12) United States Patent
Wang et al.

(10) Patent No.: US 7,446,068 B2
(45) Date of Patent: Nov. 4, 2008

(54) COMPOSITION OF DIELECTRIC MATERIAL

(75) Inventors: Yiling Wang, Shanghai (CN); Wenjun Wu, Shanghai (CN); Meyiu Zhao, Shanghai (CN); Wei Li, Shanghai (CN); Tsai Tsung Tsai, Kaohsiung (TW); Akira Sawasaki, Kanagawa Prefecture (JP)

(73) Assignee: Walsin Technology Corporation, Taipei (TW)

( * ) Notice: Subject to any disclaimer, the term of this patent is extended or adjusted under 35 U.S.C. 154(b) by 80 days.

(21) Appl. No.: 11/682,105

(22) Filed: Mar. 5, 2007

(65) Prior Publication Data

US 2007/0213200 A1    Sep. 13, 2007

(30) Foreign Application Priority Data

Mar. 10, 2006   (TW) .............................. 95108307 A

(51) Int. Cl.
*C04B 35/468*   (2006.01)

(52) U.S. Cl. .................. 501/137; 501/138; 501/139

(58) Field of Classification Search .................. 501/137, 501/138, 139
See application file for complete search history.

(56) References Cited

U.S. PATENT DOCUMENTS 6,458,734 B1 *  10/2002  Sugimoto et al. ........... 501/139
7,241,712 B2 *   7/2007  Wang et al. ................. 501/137

FOREIGN PATENT DOCUMENTS

CN         1736945      *   2/2006

* cited by examiner

*Primary Examiner*—Karl E Group
(74) *Attorney, Agent, or Firm*—Volpe and Koenig PC

(57) ABSTRACT

A dielectric material is provided. The dielectric material includes a main composition including a $Ba_2Ti_9O_{20}$ having a weight ranged from 50 to 94.9 wt %; a first sub-composition including a $GeO_2$ and an $MnCO_3$ respectively having a weight ranged from 0.01 to 10 wt %; and a second sub-composition including a glass additive composed of a $B_2O_3$, a ZnO, a $SiO_2$ and at least one of a CuO, a $CaCO_3$ and a $BaCO_3$, wherein the glass additive has a weight ranged from 5 to 40 wt %.

2 Claims, No Drawings

COMPOSITION OF DIELECTRIC MATERIAL

FIELD OF THE INVENTION

The present invention relates to a composition of dielectric material, and more particularly to a composition of dielectric material applicable to the ceramic electric part used at the high-frequency area, e.g. the multi layers ceramic capacitor (MLCC) and the LC filter.

BACKGROUND OF THE INVENTION

So far, the ceramic composition that can be sintered at more than 1280° C. is widely used in the industry; however, it becomes semi-conductive when sintered in the neutral atmosphere such as $N_2$. Therefore, it is impossible to use low melting metals like Ag and Cu as inner electrodes. Hence, it is very difficult to manufacture the MLCC and LC filter at a low price. In order to use the low melting Ag or Cu, it is necessary to study the dielectric ceramics that has a low sintering temperature and does not become semi-conductive when sintered in the low oxygen atmosphere such as $N_2$.

In order to overcome the drawbacks in the prior art, a novel composition of dielectric material is provided. The particular design in the present invention not only solves the problems described above, but also is easy to be implemented. Thus, the present invention has the utility for the industry.

SUMMARY OF THE INVENTION

It is an aspect of the present invention to provide a composition that has a densification temperature lower than 950° C. and does not become semi-conductive when sintered in the $N_2$ atmosphere.

It is another aspect of the present invention to provide a ceramics that has the absolute value of temperature coefficient of dielectric constant below 20 ppm, the $\epsilon$ value lower than 35, the Q value at 2 GHz more than 2,000, and the insulation resistance (IR) value more than 10,000 GΩ at both 25° C. and 150° C. Besides, with the ceramics of the present invention, the base metal like Cu can be used as the inner electrode for the MLCC and LC filter.

It is a further aspect of the present invention to provide a dielectric material. The dielectric material includes a main composition including a $Ba_2Ti_9O_{20}$ having a weight ranged from 50 to 94.9 wt %; a first sub-composition including a $GeO_2$ and an $MnCO_3$ respectively having a weight ranged from 0.01 to 10 wt %; and a second sub-composition including a glass additive composed of a $B_2O_3$, a ZnO, a $SiO_2$ and at least one of a CuO, a $CaCO_3$ and a $BaCO_3$, wherein the glass additive has a weight ranged from 5 to 40 wt %.

It is further another aspect of the present invention to provide a dielectric material. The dielectric material includes a main composition including a $Ba_2Ti_9O_{20}$ having a weight ranged from 50 to 94.9 wt %; a first sub-composition including a $GeO_2$ and an $MnCO_3$ respectively having a weight ranged from 0.01 to 10 wt %; and a second sub-composition including a glass additive having a weight ranged from 5 to 40 wt %.

The above objects and advantages of the present invention will become more readily apparent to those ordinarily skilled in the art after reviewing the following detailed descriptions.

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

The method for manufacturing the disk capacitor by using the un-reducing dielectric material related to the present invention will be described as follows.

At first, $BaCO_3$, $TiO_2$, MgO, $B_2O_3$, ZnO, $SiO_2$, CuO and $CaCO_3$ are prepared as raw materials. Then, $BaCO_3$ and $TiO_2$ are mixed by the wet method after weighing, and are calcined at 1150° C. for 4 hours after drying. Finally, $Ba_2Ti_9O_{20}$ powder is obtained after crashing and screening (40 mesh).

At first, the compositions of $GeO_2$ and $MnCO_3$ are prepared, as shown in Table 1.

TABLE 1

| Series | $GeO_2$ | $MnCO_3$ |
|---|---|---|
| A | 100 | 0 |
| B | 0 | 100 |
| C | 25 | 75 |
| D | 50 | 50 |
| E | 75 | 25 |

Then, B2O3, ZnO, SiO2 and at least one of CuO, CaCO3 and BaCO3 are mixed after weighing, as shown in Table 2 (sub-composition II).

TABLE 2

| Series | $B_2O_3$ | ZnO | $SiO_2$ | CuO | CaO | BaO |
|---|---|---|---|---|---|---|
| A | 42.1 | 46 | 6.9 | 5 | — | — |
| B | 40 | 40 | 10 | 10 | — | — |
| C | 36.2 | 30 | 7.8 | 13.5 | 10.5 | — |
| D | 32 | 41.3 | 8.7 | 10 | 10 | — |
| E | 36 | 40.5 | 8.5 | 8 | — | 7 |
| F | 30.2 | 37.6 | 7.4 | 12.8 | — | 12 |
| G | 31.5 | 40.3 | 9.2 | 6 | 4 | 6 |

Next, they were melted at 1200° C. for 5 minutes and poured into the cool water. After drying, the powder is crashed, screened and pulverized by the wet milling. Finally, the glass powder having the composition of Table 2 (sub-composition II) is obtained. After weighing, as shown in Table 3, $Ba_2Ti_9O_{20}$, $GeO_2$, and $MnCO_3$ (sub-composition I), the glass powder (sub-composition II) are mixed by the ball-milling method, and subsequently screened by 40 mesh after drying. Finally, the ceramic and glass mixing powder as shown in Table 3 is obtained. In this embodiment, $GeO_2$, $MnCO_3$ (sub-composition I) are added to $BaCO_3$, $TiO_2$ before calcination. It is confirmed if the final composition is the same as that of Table 3, the electric characteristic thereof is the same as that in the case that $GeO_2$, $MnCO_3$ (sub-composition I) are added with glass to $Ba_2Ti_9O_{20}$ after calcination as described above.

TABLE 3

| Sample No. | Main composition (wt %) | Sub-composition 1 ($GeO_2$, $MnCO_3$) (wt %) | Series | Sub-composition II (Glass additive) (wt %) | Series |
|---|---|---|---|---|---|
| *1 | 94.9 | 0.1 | a | 5 | A |
| 2 | 79.9 | 0.1 | a | 20 | A |
| *3 | 59.9 | 0.1 | a | 40 | A |

TABLE 3-continued

| Sample No. | Main composition (wt %) | Sub-composition 1 (GeO₂, MnCO₃) (wt %) | Series | Sub-composition II (Glass additive) (wt %) | Series |
|---|---|---|---|---|---|
| *4 | 94.0 | 1.0 | b | 5 | B |
| 5 | 69.0 | 1.0 | b | 30 | B |
| *6 | 59.0 | 1.0 | b | 40 | B |
| *7 | 79.995 | 0.005 | c | 20 | C |
| 8 | 60.0 | 5.0 | c | 35 | C |
| 9 | 70.0 | 10.0 | c | 20 | D |
| *10 | 45.0 | 15.0 | c | 40 | D |
| *11 | 94.0 | 1.0 | d | 5 | E |
| 12 | 74.0 | 1.0 | d | 25 | E |
| *13 | 59.995 | 0.005 | d | 40 | E |
| 14 | 79.0 | 1.0 | d | 20 | F |
| *15 | 64.995 | 0.005 | d | 35 | F |
| *16 | 90.0 | 5.0 | d | 5 | G |
| *17 | 90.0 | 0 | d | 10 | G |
| 18 | 85.0 | 5.0 | e | 10 | G |
| 19 | 80.0 | 5.0 | e | 15 | G |
| 20 | 75.0 | 5.0 | e | 20 | G |
| 21 | 70.0 | 5.0 | e | 25 | G |
| 22 | 65.0 | 5.0 | e | 30 | G |
| *23 | 55.0 | 15.0 | e | 30 | G |
| *24 | 55.0 | 5.0 | e | 40 | G |
| *25 | 79.995 | 0.005 | e | 20 | G |
| 26 | 79.990 | 0.010 | e | 20 | G |
| 27 | 79.9 | 0.1 | e | 20 | G |
| 28 | 79.0 | 1.0 | e | 20 | G |
| 29 | 75.0 | 5.0 | e | 20 | G |
| 30 | 70.0 | 10.0 | e | 20 | G |
| *31 | 65.0 | 15.0 | e | 20 | G |

*Mark is out of the present invention

The mixing powders are mixed with 5~6 wt % of 6% solution of PVA as the binder. Then, the pellets with 10 mm diameter and 1.0 mm thickness are formed by the dry-press at 2 ton/cm². After the binder is burned out, the pellets are sintered at 900 to 950° C. for 2 hours in the N2 atmosphere. After the density of the pellets (The measuring result is shown in Table 3) is measured, Ag paste is printed on both sides of the pellets, and then the pellets are fired at 650° C. Subsequently, the samples having the composition of Table 2 are obtained.

Afterwards, the dielectric constant and Q value at 2 GHz, the insulation resistance (Charge DC 100V, 2 Min.) at both 25° C. and 150° C., and the temperature coefficient of dielectric constant at 1 MHz, 1 Vrms are measured. The temperature coefficient of dielectric constant is calculated by the following formula:

$$\text{temperature coefficient (ppm/C)} = ((C_{150} - C_{-55})/C_{20}) * (1/(150-(-55))) * 10^6$$

The measuring results are shown in Table 4. Next, the reason of restriction of composition will be explained by using Table 4.

TABLE 4

| Sample No. | Sintering Temp. (° C.) | Dielectric constant ∈ | Q value at 2 GHz | IR at 25° C. GΩ | IR at 150° C. GΩ | Temperature coefficient (ppm/C.) | Density (g/cm³) |
|---|---|---|---|---|---|---|---|
| *1 | >950° C. | — | — | — | — | — | — |
| 2 | 920° C./4 Hr | 24.3 | 2,450 | 26,000 | 22,000 | 16.5 | 4.1 |
| *3 | 920° C./4 Hr | 25.6 | 1,580 | 18,500 | 16,500 | −35.0 | 4.1 |
| *4 | >950° C. | — | — | — | — | — | — |
| 5 | 940° C./4 Hr | 22.3 | 2,700 | 28,000 | 16,000 | 12.8 | 4.3 |
| *6 | 950° C./4 Hr | 21.6 | 1,815 | 15,600 | 15,000 | −52.0 | 4.1 |
| *7 | 920° C./4 Hr | 25.3 | 2,350 | 230 | 60 | 12.0 | 4.1 |
| 8 | 910° C./2 Hr | 28.1 | 2,650 | 31,500 | 27,500 | 15.6 | 4.2 |
| 9 | 920° C./2 Hr | 26.5 | 2,250 | 38,600 | 29,500 | −17.0 | 4.2 |
| *10 | 930° C./2 Hr | 30.6 | 1,480 | 29,500 | 26,000 | −61.0 | 4.1 |
| *11 | >950° C. | — | — | — | — | — | — |
| 12 | 940° C./2 Hr | 25.3 | 2,310 | 22,300 | 20,500 | −14.0 | 4.2 |
| *13 | 920° C./2 Hr | 26.5 | 1,580 | 560 | 60 | −39.0 | 4.2 |
| 14 | 950° C./4 Hr | 27.9 | 2,630 | 35,000 | 32,500 | −14.2 | 4.2 |
| *15 | 920° C./2 Hr | 28.0 | 2,800 | 280 | 20 | −16.3 | 4.1 |
| *16 | >950° C. | — | — | — | — | — | — |
| *17 | 920° C./4 Hr | 25.3 | 2,450 | 120 | 8 | −12.1 | 4.1 |
| 18 | 930° C./4 Hr | 28.6 | 2,320 | 42,500 | 38,800 | −5.8 | 4.3 |
| 19 | 920° C./2 Hr | 26.3 | 2,360 | 31,500 | 30,000 | −10.2 | 4.2 |
| 20 | 910° C./4 Hr | 27.2 | 3,400 | 28,900 | 28,500 | 7.9 | 4.2 |
| 21 | 900° C./2 Hr | 28.6 | 4,100 | 33,500 | 32,800 | 10.2 | 4.1 |
| 22 | 880° C./2 Hr | 26.4 | 2,350 | 42,000 | 38,000 | −18 | 4.1 |
| *23 | 900° C./2 Hr | 26.3 | 1,150 | 27,500 | 21,000 | −45.6 | 4.2 |
| *24 | 890° C./2 Hr | 22.3 | 960 | 18,500 | 16,500 | −98.8 | 4.2 |
| *25 | 920° C./2 Hr | 25.6 | 3,300 | 420 | 18 | 9.8 | 4.1 |
| 26 | 920° C./2 Hr | 28.3 | 3,700 | 17,400 | 13,500 | −5.9 | 4.2 |
| 27 | 920° C./2 Hr | 27.8 | 4,400 | 28,600 | 22,000 | −8.8 | 4.2 |
| 28 | 920° C./2 Hr | 26.5 | 3,850 | 29,800 | 20,000 | −9.6 | 4.1 |
| 29 | 930° C./2 Hr | 28.5 | 2,950 | 30,500 | 22,500 | −3.8 | 4.1 |
| 30 | 930° C./2 Hr | 29.1 | 3,100 | 42,500 | 25,600 | −9.0 | 4.2 |
| *31 | 930° C./2 Hr | 30.3 | 1,750 | 32,500 | 22,500 | −62.0 | 4.1 |

*Mark is out of the present invention

The glass addition less than 5 wt %, such as Sample Nos. 1, 4, 11 or 16, can not be sintered at 950° C. On the other hand, the glass addition more than 40 wt %, such as Sample Nos. 3, 6, 10, 13 or 24, is not good to show the Q value below 2,000 and the temperature coefficient thereof is higher than 20 ppm/C. The $GeO_2$ and $MnCO_3$ addition less than 0.01 wt %, such as Sample Nos. 7, 13, 15, 17 or 25, has a lower IR value below 10,000 GΩ at both 25° C. and 150° C. Moreover, the $GeO_2$ and $MnCO_3$ addition more than 10 wt %, such as Sample Nos. 10, 23 or 31, is not good to show the Q value below 2,000, and the temperature coefficient thereof is higher than 20 ppm/C.

In conclusion, the present invention provides a composition that has a densification temperature lower than 95° C. and does not become semi-conductive when sintered in the $N_2$ atmosphere. Besides, the present invention also provides a ceramics that has the absolute value of temperature coefficient of dielectric constant below 20 ppm, the ϵ value lower than 35, the Q value at 2 GHz more than 2,000, and the insulation resistance value more than 10,000 GΩ at both 25° C. and 150° C. With the ceramics of the present invention, the base metal like Cu can be used as the inner electrode for the MLCC and LC filter. Therefore, the present invention effectively solves the problems and drawbacks in the prior art, and thus it fits the demand of the industry and is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A dielectric material, comprising:
   a main composition comprising a $Ba_2Ti_9O_{20}$ having a weight ranged from 50 to 94.9 wt %;
   a first sub-composition comprising a $GeO_2$ and an $MnCO_3$ respectively having a weight ranged from 0.01 to 10 wt %; and
   a second sub-composition comprising a glass additive composed of a $B_2O_3$, a ZnO, a $SiO_2$ and at least one of a CuO, a $CaCO_3$ and a $BaCO_3$, wherein the glass additive has a weight ranged from 5 to 40 wt %.

2. A dielectric material, comprising:
   a main composition comprising a $Ba_2Ti_9O_{20}$ having a weight ranged from 50 to 94.9 wt %;
   a first sub-composition comprising a $GeO_2$ and an $MnCO_3$ respectively having a weight ranged from 0.01 to 10 wt %; and
   a second sub-composition comprising a glass additive having a weight ranged from 5 to 40 wt %.

* * * * *